Figure 1:
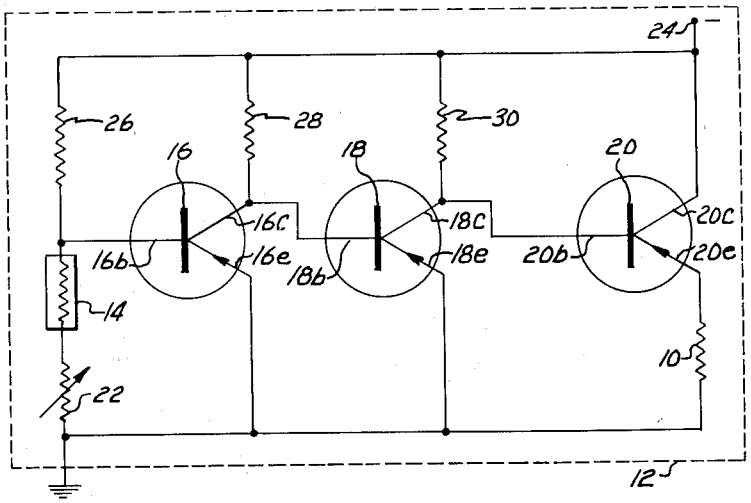

March 14, 1961     F. N. CARLSON     2,975,260
ELECTRICAL HEATER CONTROL CIRCUITS
Filed April 14, 1958

INVENTOR.
FRANK N. CARLSON
BY
*Christie, Parker & Hale*
ATTORNEYS

2,975,260
Patented Mar. 14, 1961

2,975,260

ELECTRICAL HEATER CONTROL CIRCUITS

Frank N. Carlson, Sierra Madre, Calif., assignor, by mesne assignments, to Consolidated Electrodynamics Corporation, Pasadena, Calif., a corporation of California Filed Apr. 14, 1958, Ser. No. 728,332

8 Claims. (Cl. 219—20)

The present invention relates to control circuits and more particularly to an electrical heater control circuit.

Many of the components such as electrical instruments that are incorporated in missiles and other airborne systems must be maintained at a relatively constant temperature or within a limited range of temperatures to operate satisfactorily. Since such systems are often subjected to very low temperatures and rapid temperature changes, it is necessary to supply large amounts of heat to the instruments in short intervals of time. The temperature of such instruments is generally controlled by varying the electrical energy supplied to an electrical heating element which in turn supplies heat to the instruments.

Various types of electrical heater control circuits have heretofore been proposed. Probably the most widely used heater control circuit is of the on-off type wherein a thermostat or other temperature sensitive switch is utilized to switch the heating element on or off. While this type of control circuit is relatively simple and inexpensive, it may present problems where the source of power for the heating element is also utilized to supply power to precision electrical instruments and amplifiers for amplifying the signals from the instruments. Such temperature sensitive switches create surges of current and transient voltage conditions in the power supply voltage when switching the heater on or off which may undesirably affect the operation of the electrical instruments connected to the power supply. Such transient voltage conditions may also be amplified by the sensitive amplifiers that are energized by the power supply to provide error signals in the output circuits of such amplifiers.

Continuous type temperature control circuits which do not cause switching surges have also been utilized in the past, but the ratio of maximum to minimum power handling capabilities of such prior art circuits is generally very small which renders the use of such prior art circuits undesirable in an environment in which the ambient temperature is subject to rapid change. Also, such prior art continuous type control circuits require complex and expensive electronic circuitry.

In accordance with the present invention, a heater control circuit is provided for continuously controlling the power supplied to an electrical heating element which has a very high ratio of maximum to minimum power handling capabilities and which is efficient, reliable and relatively inexpensive to manufacture.

In accordance with the present invention, a heater control circuit for maintaining a body or chamber at or above a predetermined temperature is provided which includes an electrical heating element that is disposed in heat transfer relationship with the body or chamber. A transistor including an input and an output circuit is provided for controlling the power supplied to the heating element which is connected in series with the output circuit of the transistor. Means responsive to the temperature of the body or chamber are provided for supplying a control signal representative of the temperature of the body or chamber to the input circuit of the transistor. The heater control circuit of the present invention can be utilized to control a relatively high-power electrical heating element from a low-power sensing device such as a thermistor. Where the temperature of a chamber is to be controlled, the transistor as well as the heating element and the temperature sensing element may be disposed within the chamber. This type of circuit provides a thermal-type negative feed-back for stabilization which prevents substantial variations in the temperature within the chamber where the ambient temperature is below the predetermined temperature.

Figure 2:
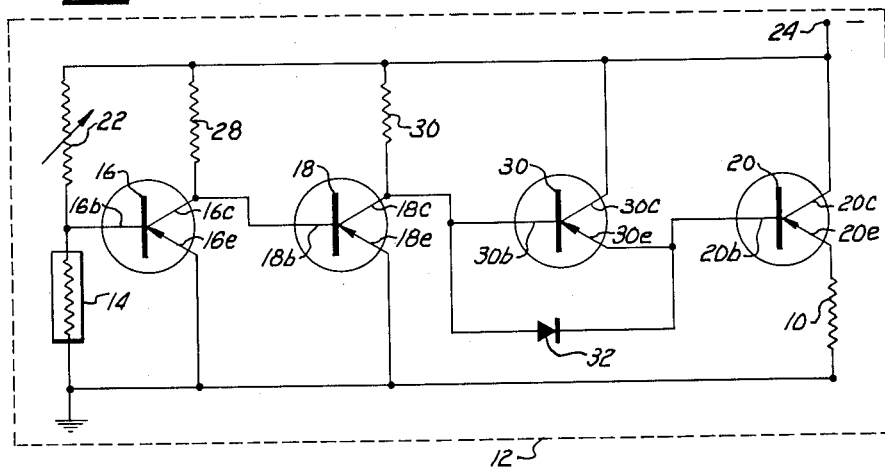

The invention is described in more detail in reference to the accompanying drawing in which:

Fig. 1 is a schematic circuit diagram of one embodiment of the present invention and, Fig. 2 is a schematic circuit diagram of another embodiment of the present invention.

Referring now to the drawing wherein like components are designated by the same reference numerals throughout the several figures, and more particularly to Fig. 1, there is shown an electrical heating element 10 that is disposed within a chamber 12. The chamber 12 is arranged to include the instruments or other apparatus (not shown) which must be maintained at a relatively constant temperature. A temperature sensitive element 14 which may, for example, be a thermistor, is also disposed within the chamber 12 for sensing the temperature within this chamber. First, second and third transistors 16, 18 and 20 are provided in the circuit for controlling the current through the heating element 10 in accordance with the impedance of the thermistor 14. The transistors 16, 18 and 20 may be of the PNP junction variety and include emitter, base and collector electrodes designated by the subscripts $e$, $b$ and $c$ respectively. The transistor 16 is connected in a grounded emitter configuration with its emitter electrode $16_e$ connected to ground. The thermistor 14 and a variable resistor 22 such as a potentiometer are connected in series between the base and emitter electrodes or across the input circuit of the transistor 16. Electrical energy is supplied to the thermistor 14 from a suitable source of energizing potential (not shown) that is connected to a terminal 24 through a base bias resistor 26. The polarity of the terminal 24 is negative as indicated. Since the resistance of the thermistor 14 is determined by its absolute temperature the resistance and voltage across the base and emitter electrodes of the transistor 16 is also a function of the temperature within the chamber 12.

A collector resistor 28 is connected between the terminal 24 and the collector $16_c$ to furnish operating potential to the transistor 16. The collector electrode $16_c$ is directly coupled to the base electrode of the transistor 18 which is also connected in a grounded emitter configuration with the emitter electrode $18_e$ being connected to ground. A collector resistor 30 is connected between the collector electrode $18_c$ and the terminal 24 for supplying operating potential to the transistor 18. The electrode $18_c$ is connected directly to the base electrode of the transistor 20 for feeding the signal developed in the transistor 18 to the input circuit of the transistor 20. The transistor 20 is connected in a grounded collector configuration with the collector electrode $20_c$ being connected directly to the terminal 24. The heating element 10 is shown connected between the emitter electrode $20_e$ and ground.

In operation the potentiometer 22 is initially adjusted so that at a predetermined temperature the combined voltage drop across the thermistor 14 and the potentiometer 22 is slightly less than that required to render the transistor 20 conducting. The thermistor 14 has a negative temperature co-efficient so that at high temperatures the impedance of the thermistor 14 is low and vice versa.

Thus when the temperature of the chamber 12 decreases below the predetermined or desired temperature the impedance of the thermistor 14 increases and thereby raises the potential of the base $16_b$ to increase the conduction of the transistor 16. This causes the voltage at the collector electrode $16_c$ to decrease which in turn decreases the potential between the base and emitter electrodes of the transistor 18 and thereby decreases the conduction of this transistor. The collector electrode $18_c$ now goes negative and forward, biases the base-emitter junction of the transistor 20 which turns on this transistor and causes current to flow through the heating element 10. The current flow through this heating element increases the temperature within the chamber 12. As the temperature within the chamber 12 increases, the impedance of the thermistor 14 decreases thereby decreasing the conduction of the transistor 16. This increases the conduction of the transistor 18 and decreases the conduction of the transistor 20. This results in less current flow through the heating element 10. In this manner the circuit of Fig. 1 causes the temperature within the chamber 12 to asymptotically approach the predetermined temperature. The power gain of the three transistors 16, 18 and 20 is sufficient to provide a large change in the current supplied to the heating element in response to very small voltage changes across the temperature sensing element or thermistor 14. Thus a very low power temperature sensing element may be used in the circuit of Fig. 1 to control a high power heating element.

Referring now to the Fig. 2, there is shown a heater control circuit utilizing four transistors for controlling the power to an electrical heating element. The circuit of Fig. 2 is similar to the circuit of Fig. 1 with the exception that an impedance matching transistor 30 is connected between the transistors 18 and 20 to provide an over-all control circuit having a higher gain than the circuit of Fig. 1. In the circuit of Fig. 2 the thermistor 14 is connected directly between the base electrode of the transistor 16 and ground to provide maximum sensitivity of the control circuit to the impedance changes of the thermistor 14. The adjustable bias resistor 22 is connected between the terminal 24 and the base electrode $16_b$ to permit initial adjustment of the circuit and thereby establish the predetermined temperature. The impedance matching transistor 30 may be of the PNP junction variety and includes base emitter and collector electrodes designated by the subscripts $b$, $e$ and $c$, respectively. As is shown, the base electrode $30_b$ is connected directly to the collector electrode $18_c$, the emitter electrode $30_e$ is connected directly to the base electrode $20_b$ and the collector electrode $30_c$ is connected directly to the terminal 24. A temperature stabilizing diode 32 is connected across the base and emitter electrodes of the transistor 30 to provide a low impedance path for the collector saturation current ($I_{co}$) of the transistor 20. Without such a diode the temperature dependent collector saturation current of the transistor 20 might raise the potential of the base electrode $20_b$ and render the transistor 20 conducting in the absence of an appropriate control signal from the transistor 14.

While the transistors in the circuits of Figs. 1 and 2 are illustrated as being disposed within the chamber 12, the transistors may be located outside of the chamber if desired.

There has thus been disclosed a transistor heater control circuit which continuously controls the current flow through a suitable heating element to maintain a chamber at or above a predetermined temperature with rapid changes in the ambient temperature.

I claim:

1. In a heater control circuit for continuously maintaining the temperature of a body or chamber substantially at or above a predetermined temperature the combination which comprises a unit to be temperature controlled, an electrical heating element disposed in heat transfer relationship with said unit, means including a low power heat responsive element disposed in heat transfer relationship with said unit for providing an electrical control signal representative of the temperature of said unit, power transistor circuit means including input and output circuits therefor, means for directly connecting the heating element in series with the output circuit and means for directly applying the control signal to the input circuit whereby current through the heating element continually varies in accordance with said control signal to thereby regulate the temperature of the chamber at the predetermined temperature.

2. A heater control circuit for continuously maintaining the temperature of a body or chamber substantially at or above a predetermined temperature comprising an element to be temperature controlled, an electrical heating element disposed in heat transfer relationship with said element, a thermistor disposed in heat transfer relationship with said element, high power circuit means including at least a single transistor power amplifier having an input and an output circuit, means for directly connecting the heating element in series with the output circuit of the transistor, and means directly interconnecting the thermistor with said transistor for continuously applying a signal to the input circuit of the transistor that is representative of the impedance of the thermistor and thereby the sensed temperature of said element under control.

3. In an electrical heater control circuit for continuously regulating the temperature within a chamber at a predetermined temperature the combination which comprises a chamber to be temperature controlled, an electrical heating element disposed within the chamber, first and second power amplifying transistors, each of the transistors including an emitter, a base and a collector electrode, low power means responsive to the heat within the chamber and connected for directly and continuously applying a signal representative of the temperature within the chamber between the base and emitter electrodes of the first transistor, means for coupling the collector and emitter electrodes of the first transistor across the base and emitter electrodes of the second transistor and means for connecting the heater element in series with collector and emitter electrodes of the second transistor.

4. An electrical circuit for continuously regulating the temperature within a chamber comprising a chamber to be temperature controlled, an electrical heating element disposed within the chamber, first, second and third transistors, each of the transistors including an emitter, a base and a collector electrode, low power means responsive to the heat within the chamber for applying a control signal representative of the temperature within the chamber across the base and emitter electrodes of the first transistor, direct current conductive means connected between the collector electrode of the first transistor and the base electrode of the second transistor, direct current conductive means connected between the collector electrode of the second transistor and the base electrode of the third transistor, and means connecting the heating element in series with the collector and emitter electrodes of the third transistor whereby the current through the heating element varies in accordance with said control signal to thereby continuously regulate the temperature of the chamber.

5. The combination as defined in claim 4 wherein the means responsive to the heat within the chamber is a thermistor and wherein each of the transistors and the thermistor are disposed within the chamber.

6. A heater control circuit for continuously maintaining the temperature within a chamber at or above the predetermined temperature comprising a chamber to be temperature controlled, an electrical heating element disposed within the chamber, first, second and third transistors, each of the transistors including an emitter, a base and a collector electrode, a thermistor and a variable resistor connected between the base and emitter electrodes of the first transistor, a source of energizing potential, a resistor connected between the base of the first transistor and the source of energizing potential, a resistance connected individually between the source of energizing potential and the collector electrodes of the first and second transistors, the collector electrode of the first transistor being connected directly to the base of the second transistor, the collector electrode of the third transistor being connected directly to the base of the third transistor, the emitter electrode of the second transistor being connected to the emitter electrode of the first transistor, the collector electrode of the third transistor being coupled to the source of energizing potential, the heating element being connected between the emitter electrode of the third transistor and the emitter electrodes of the first and second transistors.

7. An electrical control circuit for maintaining the temperature within a chamber at or above a predetermined temperature comprising an electrical heating element disposed within the chamber, a thermistor disposed within the chamber, first, second, third and fourth transistors, each of the transistors including a base, an emitter and a collector electrode, a source of energizing potential, a variable resistor connected between the source of energizing potential and the base electrode of the first transistor, the thermistor being connected between the base and emitter electrodes of the first transistor, a resistor connected individually between the source of energizing potential and the collector electrodes of the first and second transistors, the collector electrode of the first transistor being connected directly to the base of the second transistor, the collector electrode of the second transistor being connected directly to the base of the third transistor, the emitter electrodes of the first and second transistors being connected together, the emitter electrode of the third transistor being connected directly to the base electrode of the fourth transistor, means connecting the collector electrodes of the third and fourth transistors to the source of energizing potential, a diode connected between the base and emitter electrodes of the third transistor, the heating element being connected between the emitter electrode of the fourth transistor and the emitter electrodes of the first and second transistors.

8. In an electrical circuit for continuously regulating the temperature within a chamber of the combination which comprises a chamber to be temperature controlled, first, second, third and fourth transistors, each of the transistors including a base, an emitter and a collector electrode, an electrical heating element connected in series with the emitter electrode of the fourth transistor and disposed within the chamber, a thermistor connected between the base and emitter electrodes of the first transistor and disposed within the chamber, means connecting the collector electrodes of the first and second transistors to the base electrodes of the second and third transistors, respectively, means connecting the emitter electrode of the third transistor to the base electrode of the fourth transistor and a diode connected between the base and emitter electrodes of the third transistor.

References Cited in the file of this patent

UNITED STATES PATENTS

| | | |
|---|---|---|
| 2,126,398 | Knowles | Aug. 9, 1938 |
| 2,522,521 | Kock | Sept. 19, 1950 |
| 2,751,549 | Chase | June 19, 1956 |
| 2,801,298 | Mital | July 30, 1957 |
| 2,870,310 | Van Overbeek | Jan. 20, 1959 |
| 2,872,556 | Obermaier | Feb. 3, 1959 |
| 2,932,714 | Merrill | Apr. 12, 1960 |

OTHER REFERENCES

Beter et al.: "Directly Coupled Transistor Circuits," Electronics, June 1955.